US012801237B2

(12) United States Patent
Park et al.

(10) Patent No.: US 12,801,237 B2
(45) Date of Patent: Nov. 17, 2026

(54) ELECTRONIC DEVICE AND INTERFACE DEVICE INCLUDING THE SAME

(71) Applicant: Samsung Display Co., Ltd., Yongin-Si (KR)

(72) Inventors: Youngmin Park, Yongin-si (KR); Sanghun Park, Yongin-si (KR); Yongsub So, Yongin-si (KR); Bo-Hwan Lee, Yongin-si (KR); Hoeung Lee, Yongin-si (KR); Byeongkyu Jeon, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 19/093,139

(22) Filed: Mar. 27, 2025

(65) Prior Publication Data

US 2025/0306706 A1 Oct. 2, 2025

(30) Foreign Application Priority Data

Mar. 29, 2024 (KR) ........................ 10-2024-0043479

(51) Int. Cl.
*G06F 3/041* (2006.01)
*G06F 3/0354* (2013.01)
(Continued)

(52) U.S. Cl.
CPC ...... *G06F 3/04166* (2019.05); *G06F 3/03545* (2013.01); *G06F 3/0383* (2013.01); *G06F 3/04162* (2019.05); *G06F 3/0441* (2019.05); *G06F 3/0442* (2019.05); *H04W 72/21* (2023.01); *H04W 72/23* (2023.01)

(58) Field of Classification Search
CPC .. G06F 3/0442; G06F 3/0441; G06F 3/03545; G06F 3/04162
See application file for complete search history.

(56) References Cited

U.S. PATENT DOCUMENTS 10,845,899 B2 * 11/2020 Hisano .................... G06F 3/038
11,422,641 B2 8/2022 Choi
(Continued)

FOREIGN PATENT DOCUMENTS

EP 3316102 B1 4/2022
KR 10-2021-0106631 A 8/2021
(Continued)

*Primary Examiner* — Robin J Mishler
(74) *Attorney, Agent, or Firm* — Innovation Counsel LLP

(57) ABSTRACT

An interface device includes an electronic device and an input device communicating with the electronic device. The electronic device includes a display layer operating in a unit of display frame including a blank period and a data period, a sensor layer disposed on the display layer and operating in a first mode to sense a first input generated by the input device, and a sensor driver driving the sensor layer and transmitting an uplink signal to the input device. The input device transmits a plurality of first downlink signals including first information and a plurality of second downlink signals including second information different from the first information, and the sensor driver successively receives the plurality of first downlink signals during the blank period and successively receives the plurality of second downlink signals during the data period.

26 Claims, 11 Drawing Sheets

(51) Int. Cl.

| | |
|---|---|
| ***G06F 3/038*** | (2013.01) |
| ***G06F 3/044*** | (2006.01) |
| ***H04W 72/21*** | (2023.01) |
| ***H04W 72/23*** | (2023.01) |

(56) References Cited

U.S. PATENT DOCUMENTS

| | | | | |
|---|---|---|---|---|
| 11,513,641 | B2 | 11/2022 | Bae et al. | |
| 2020/0201505 | A1* | 6/2020 | Jung | G06F 3/0383 |
| 2022/0171514 | A1 | 6/2022 | Kim et al. | |
| 2022/0291797 | A1 | 9/2022 | Koike et al. | |
| 2024/0160317 | A1* | 5/2024 | Jang | G06F 3/0412 |

FOREIGN PATENT DOCUMENTS

| | | | |
|---|---|---|---|
| KR | 10-2022-0077525 | A | 6/2022 |
| KR | 10-2023-0043233 | A | 3/2023 |

* cited by examiner

ELECTRONIC DEVICE AND INTERFACE DEVICE INCLUDING THE SAME

CROSS-REFERENCE TO RELATED APPLICATION(S)

This application claims priority to and the benefit of Korean Patent Application No. 10-2024-0043479, filed on Mar. 29, 2024 in the Korean Intellectual Property Office, the disclosure of which is incorporated by reference herein in its entirety.

BACKGROUND

1. Field

The present disclosure relates to an electronic device with improved sensing reliability and an interface device including the same.

2. Description of Related Art

An electronic device senses an external input applied thereto from the outside of the electronic device. The external input is a user input. The user input includes various forms of external inputs such as a part of a user's body, light, heat, pen, or pressure. The electronic device obtains coordinates of a pen using an electromagnetic resonance (EMR) scheme or an active electrostatic (AES) scheme.

SUMMARY

The present disclosure provides an electronic device with improved sensing reliability.

The present disclosure provides an interface device including the electronic device.

Embodiments of the inventive concept provide an interface device including an electronic device and an input device communicating with the electronic device. The electronic device includes a display layer operating in a unit of display frame including a blank period and a data period, a sensor layer disposed on the display layer and operating in a first mode to sense a first input generated by the input device, and a sensor driver driving the sensor layer and transmitting an uplink signal to the input device. The input device transmits a plurality of first downlink signals including first information and a plurality of second downlink signals including second information different from the first information, and the sensor driver successively receives the plurality of first downlink signals during the blank period and successively receives the plurality of second downlink signals during the data period.

The input device includes a receiver receiving the uplink signal, a transmitter transmitting the plurality of first downlink signals and the plurality of second downlink signals to the sensor driver, and a power supply supplying a power to the input device.

The first information includes information about the input device, and the second information includes a signal to determine coordinate information of the input device.

The sensor layer further operates in a second mode different from the first mode, and sensing a second input generated by a user's body.

The sensor layer operates in the second mode during the blank period.

The second mode includes a first touch mode and a second touch mode, the sensor layer senses the user's body based on a self-capacitance in the first touch mode and senses the user's body based on a mutual capacitance in the second touch mode.

Each of the plurality of second downlink signals operates in a burst mode.

Each of the plurality of second downlink signals has the same driving period.

Each of the plurality of first downlink signals has at least two different waveforms.

The plurality of first downlink signals include at least one first waveform and at least one second waveform, and the second waveform is obtained by shifting the first waveform by a predetermined phase.

The number of rising edges of the plurality of first downlink signals is smaller than a number of rising edges of the plurality of second downlink signals.

The electronic device further includes a timing controller to drive the display layer, the timing controller generates a length signal based on a length of the blank period and a length of the data period, and the timing controller transmits the length signal to the sensor driver.

The sensor driver receives the length signal and receives the plurality of first downlink signals and the plurality of second downlink signals based on the length signal.

The input device generates the plurality of first downlink signals and the plurality of second downlink signals in response to receiving the uplink signal.

The interface device further includes a data driving circuit providing a data signal to the display layer and a demultiplexer circuit electrically connected between the data driving circuit and the display layer. The display layer includes a first-first data line, a first-second data line, and a plurality of pixels. The data signal includes a first data signal having a first voltage level and a second data signal having a second voltage level different from the first voltage level, and the data period includes a first period and a second period. The demultiplexer circuit includes a first switch connected between the first-first data line and the data driving circuit and a second switch connected between the first-second data line and the data driving circuit, the first switch is activated during the first period, the data driving circuit provides the first data signal to the first-first data line, the second switch is activated during the second period, and the data driving circuit provides the second data signal to the first-second data line.

Embodiments of the inventive concept provide an electronic device including a display layer operating in a unit of display frame including a blank period and a data period, a sensor layer disposed on the display layer and operating in a first mode to sense a first input generated by an input device placed externally, and a sensor driver driving the sensor layer and transmitting an uplink signal to the input device. The sensor driver receives only a first downlink signal from the input device for the blank period, and the sensor driver receives only a second downlink signal different from the first downlink signal from the input device for the data period.

The sensor layer further operates in a second mode different from the first mode, and the second mode is a mode in which a second input generated by a touch event is sensed.

The sensor layer operates in the second mode during the blank period.

The second mode includes a first touch mode and a second touch mode, the sensor layer senses the touch event based on a self-capacitance in the first touch mode, and the sensor layer senses the touch event based on a mutual capacitance in the second touch mode.

The second downlink signal operates in a burst mode.

The second downlink signal is provided in plurality, and each of the plurality of second downlink signals has the same driving period.

The first downlink signal has at least two different waveforms.

The first downlink signal includes at least one first waveform and at least one second waveform, and the second waveform is obtained by shifting the first waveform by a predetermined phase.

The number of rising edges of the first downlink signal is smaller than a number of rising edges of the second downlink signal.

The electronic device further includes a timing controller to drive the display layer, the timing controller generates a length signal based on a length of the blank period and a length of the data period, and the timing controller transmits the length signal to the sensor driver.

The sensor driver receives the length signal and receives the first downlink signal and the second downlink signal based on the length signal.

According to the above, the number of rising edges of the first downlink signal is smaller than the number of rising edges of the second downlink signal. The second downlink signal has a level higher than a level of the first downlink signal. The sensor driver receives the first downlink signal having a relatively low level during the blank period in which noise occurs relatively less frequently and receives the second downlink signal having a relative high level during the data period in which noise occurs relatively more frequently. A signal-to-noise ratio of the sensor layer to the input device in the blank period is similar to or the same as a signal-to-noise ratio of the sensor layer to the input device in the data period. That is, the signal-to-noise ratio of the sensor layer to the input device is constant throughout the entire period. Accordingly, the sensing reliability of the interface device is improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
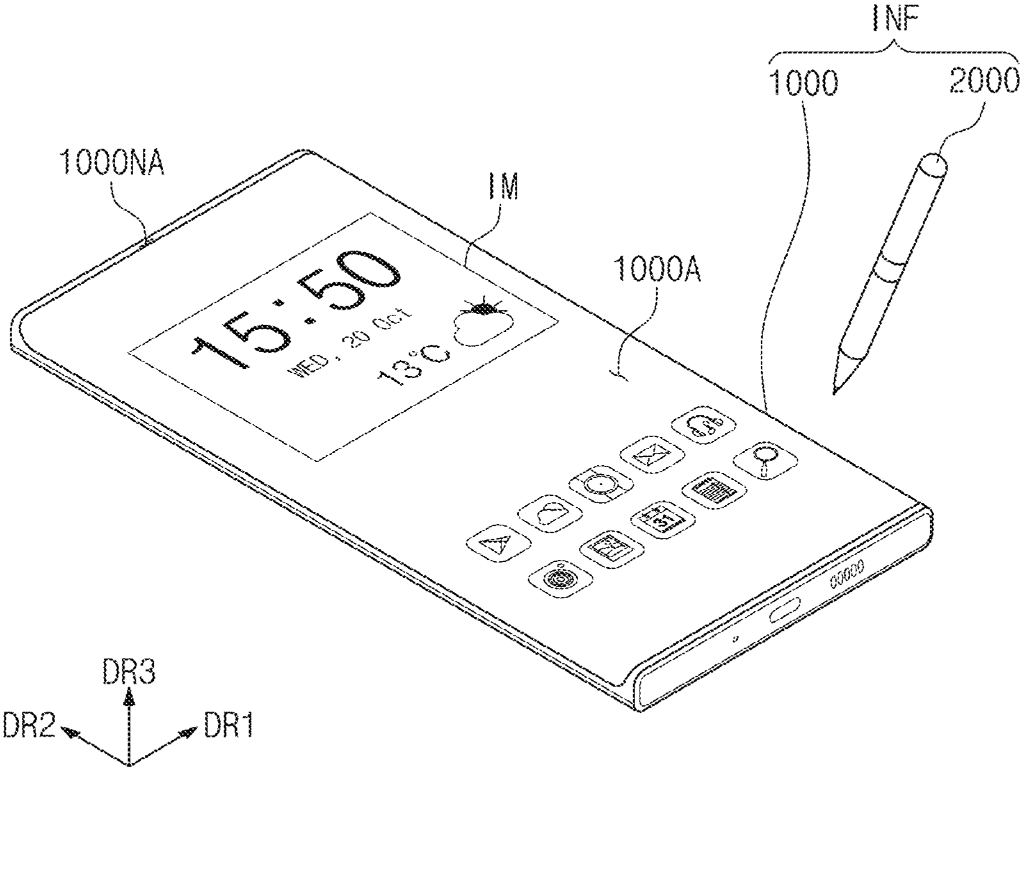
FIG. 1 is a perspective view of an interface device according to an embodiment of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described with reference to accompanying drawings.

FIG. 1 is a perspective view of an interface device INF according to an embodiment of the present disclosure.

Referring to FIG. 1, the interface device INF may include an electronic device 1000 and an input device 2000.

The electronic device 1000 may be activated in response to electrical signals. For example, the electronic device 1000 may be a mobile phone, a tablet computer, a car navigation unit, a game unit, or a wearable device, however, it should not be limited thereto or thereby. In FIG. 1, the mobile phone is shown as a representative example of the electronic device 1000.

The electronic device 1000 may include an active area 1000A and a peripheral area 1000NA which are defined therein. The electronic device 1000 may display an image IM through the active area 1000A. The active area 1000A may include a plane defined by a first direction DR1 and a second direction DR2. The peripheral area 1000NA may surround the active area 1000A.

A thickness direction of the electronic device 1000 may be substantially parallel to a third direction DR3 intersecting the first direction DR1 and the second direction DR2. Accordingly, front (or upper) and rear (or lower) surfaces of each member of the electronic device 1000 may be defined with respect to the third direction DR3.

The electronic device 1000 may display the image IM to the third direction DR3. The image IM may include a moving image as well as a still image. FIG. 1 shows a clock widget and application icons as representative examples of the image IM.

The electronic device 1000 may sense an external input applied thereto from the outside of the electronic device 1000. The external input may include a variety of forms of external inputs such as a part of a user's body, light, heat, or pressure.

The electronic device 1000 shown in FIG. 1 may sense an input generated by a user's touch or an input generated by the input device 2000. The input device 2000 may mean a device other than the part of the user's body. For example, the input device 2000 may be an active pen, a stylus pen, a touch pen, an electronic pen, or the like. The input generated by the input device 2000 may be referred to as a first input and the external inputs other than the first input may be referred to as a second input.

The electronic device 1000 and the input device 2000 may communicate bi-directionally with each other. The electronic device 1000 may apply an uplink signal to the input device 2000. The uplink signal may include, for example, a synchronization signal or information about the electronic device 1000, however, it should not be particularly limited. The input device 2000 may apply a downlink signal to the electronic device 1000. The downlink signal may include, for example, a synchronization signal or status information of the input device 2000. For example, the downlink signal may include a plurality of first downlink signals DLK1 (refer to FIG. 11) and a plurality of second downlink signals DLK1 (refer to FIG. 11).

Figure 2:
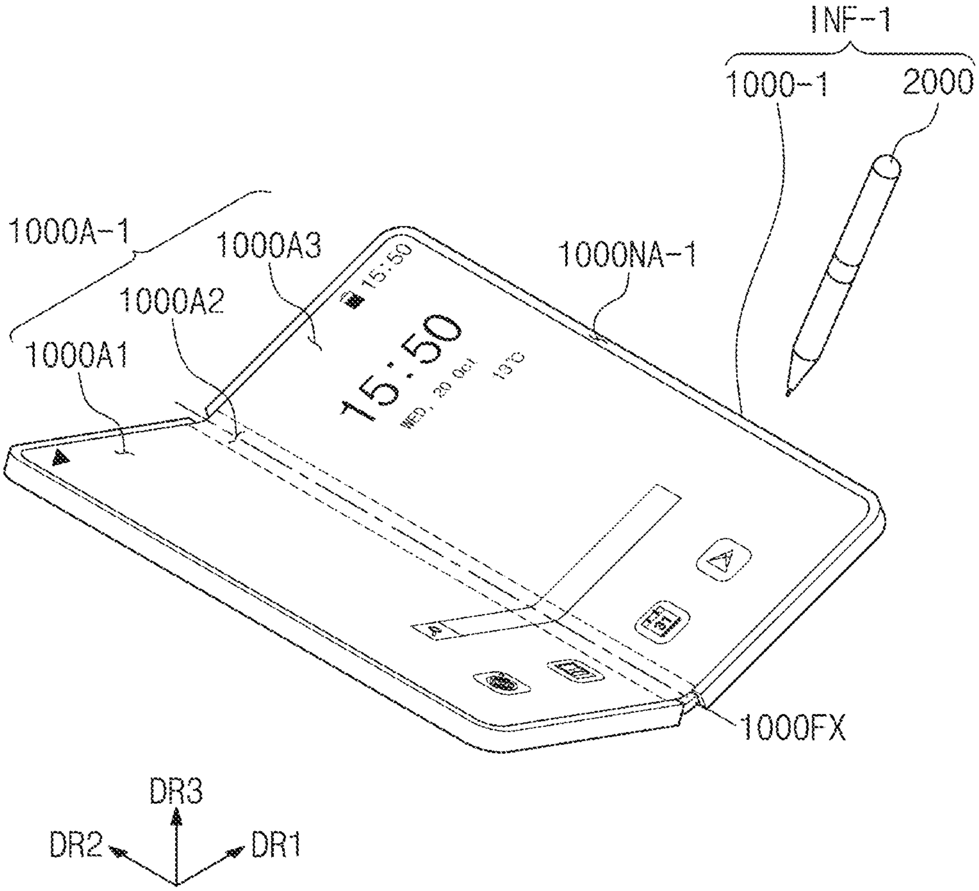
FIG. 2 is a perspective view of an interface device according to an embodiment of the present disclosure.

FIG. 2 is a perspective view of an interface device INF-1 according to an embodiment of the present disclosure. In FIG. 2, the same reference numerals denote the same elements in FIG. 1, and thus, detailed descriptions of the same elements will be omitted.

Referring to FIG. 2, an electronic device 1000-1 may display an image through an active area 1000A-1. FIG. 2 shows a state in which the electronic device 1000-1 is folded at a predetermined angle. When the electronic device 1000-1 is in an unfolded state, the active area 1000A-1 may include a plane defined by the first direction DR1 and the second direction DR2.

The active area 1000A-1 may include a first area 1000A1, a second area 1000A2, and a third area 1000A3. The first area 1000A1, the second area 1000A2, and the third area 1000A3 may be sequentially arranged in the first direction DR1. The second area 1000A2 may be folded with respect to a folding axis 1000FX extending in the second direction DR2. Accordingly, the first area 1000A1 and the third area 1000A3 may be referred to as non-folding areas, and the second area 1000A2 may be referred to as a folding area.

When the electronic device 1000-1 is folded, the first area 1000A1 and the third area 1000A3 may face each other. Accordingly, the active area 1000A-1 may not be exposed to the outside in a state where the electronic device 1000-1 is completely folded, and this may be referred to as an in-folding state. However, this is merely an example, and the folding operation of the electronic device 1000-1 should not be limited thereto or thereby.

As an example, according to an embodiment, the electronic device 1000-1 may be folded to allow the first area 1000A1 and the third area 1000A3 to face directions opposite to each other. In this case, the active area 1000A-1 may be exposed to the outside, and this may be referred to as an out-folding state.

The electronic device 1000-1 may operate in only one of the in-folding operation or the out-folding operation. According to an embodiment, the electronic device 1000-1 may operate in both the in-folding operation and the out-folding operation. In this case, the second area 1000A2 of the electronic device 1000-1 may be inwardly folded (in-folding) and outwardly folded (out-folding).

FIG. 2 shows one folding area and two non-folding areas as a representative example, however, the number of folding areas and the number of non-folding areas should not be limited thereto or thereby. As an example, the electronic device 1000-1 may include three or more non-folding areas and a plurality of folding areas disposed between the non-folding areas adjacent to each other.

As shown in FIG. 2, the folding axis 1000FX extends in the second direction DR2, however, the present disclosure should not be limited thereto or thereby. For example, the folding axis 1000FX may extend in a direction substantially parallel to the first direction DR1. In this case, the first area 1000A1, the second area 1000A2, and the third area 1000A3 may be sequentially arranged in the second direction DR2.

The active area 1000A-1 may overlap one or more electronic modules. For example, the electronic modules may include a camera module and a proximity illumination sensor. The electronic modules may receive an external input applied thereto through the active area 1000A-1 or may provide an output through the active area 1000A-1. A portion of the active area 1000A-1 overlapping the camera module and the proximity illumination sensor may have a transmittance higher than that of the other portion of the active area 1000A-1. Accordingly, it is not required to provide an area to dispose the electronic modules in a peripheral area 1000NA-1 around the active area 1000A-1. As a result, a ratio of the active area 1000A-1 to a front surface of the electronic device 1000-1 may increase.

The electronic device 1000-1 and an input device 2000 may communicate bi-directionally with each other. The electronic device 1000-1 may apply an uplink signal to the input device 2000. The input device 2000 may apply a downlink signal to the electronic device 1000-1. The electronic device 1000-1 may sense coordinates of the input device 2000 using the signal provided from the input device 2000.

Figure 3:
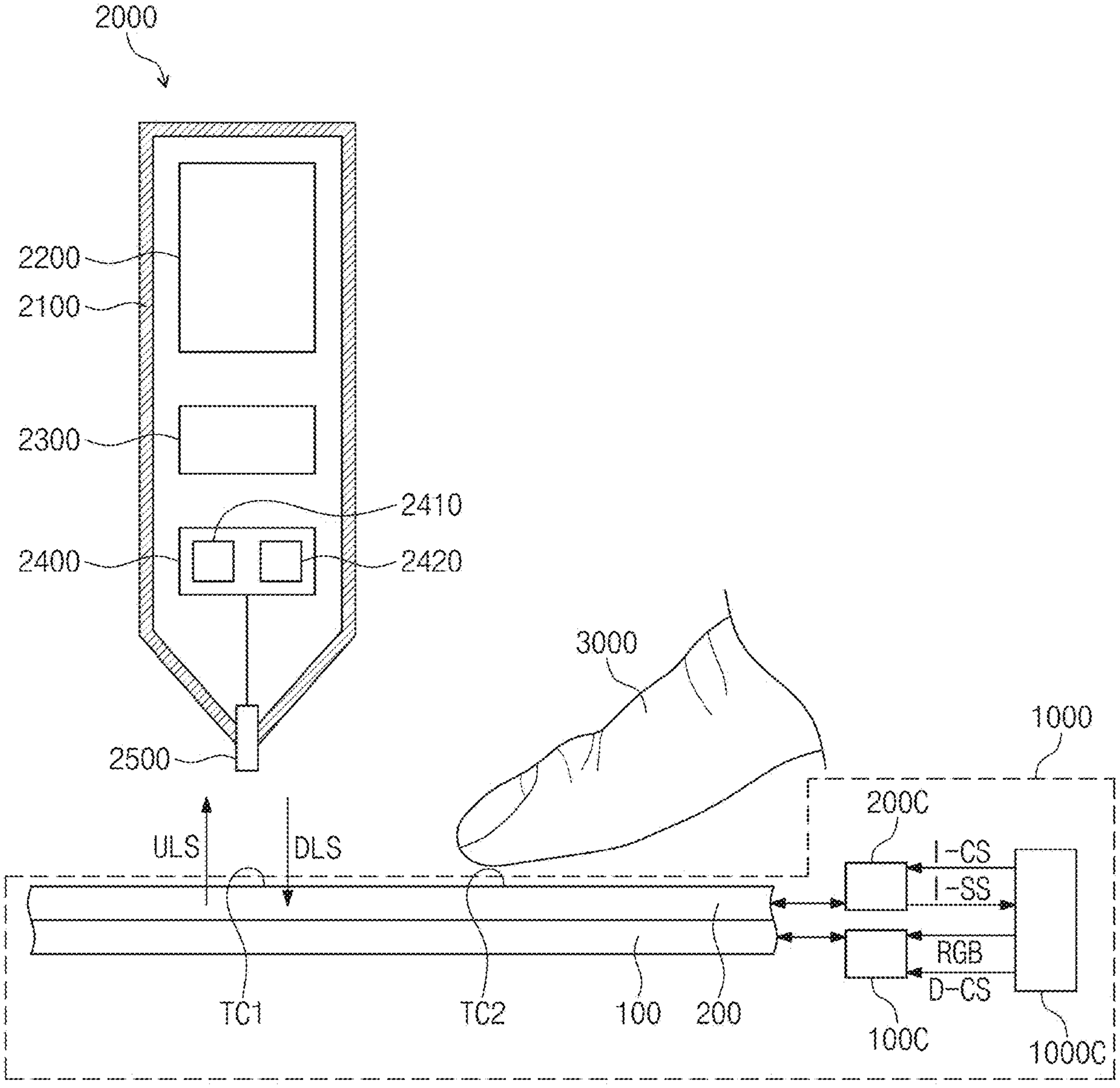
FIG. 3 is a block diagram of an electronic device and an input device according to an embodiment of the present disclosure.

FIG. 3 is a block diagram of the electronic device 1000 and the input device 2000 according to an embodiment of the present disclosure.

Referring to FIG. 3, the electronic device 1000 may include a display layer 100, a sensor layer 200, a display driver 100C, a sensor driver 200C, and a main controller 1000C.

The display layer 100 may have a configuration to generate the image. The display layer 100 may be a light emitting type display layer. For example, the display layer 100 may be an organic light emitting display layer, a quantum dot display layer, a micro-LED display layer, or a nano-LED display layer.

The sensor layer 200 may be disposed on the display layer 100. The sensor layer 200 may sense an input applied thereto from the outside. The sensor layer 200 may sense the first input TC1 generated by the input device 2000 and the second input TC2 generated by the user's body 3000.

The main controller 1000C may control an overall operation of the electronic device 1000. For instance, the main controller 1000C may control an operation of the display driver 100C and the sensor driver 200C. The main controller 1000C may include at least one microprocessor. The main controller 1000C may be referred to as a host.

The display driver 100C may control the display layer 100. The main controller 1000C may further include a graphics controller. The display driver 100C may receive image data RGB and a control signal D-CS from the main controller 1000C. The control signal D-CS may include a variety of signals. For example, the control signal D-CS may include an input vertical synchronization signal, an input horizontal synchronization signal, a main clock, and a data enable signal. The display driver 100C may generate a vertical synchronization signal and a horizontal synchronization signal based on the control signal D-CS to control a timing at which signals are applied to the display layer 100.

The sensor driver 200C may control the sensor layer 200. The sensor driver 200C may receive a control signal I-CS from the main controller 1000C. The control signal I-CS may include a mode determination signal to determine a driving mode of the sensor driver 200C and a clock signal. The sensor driver 200C may operate in a first mode to sense the first input TC1 by the input device 2000 or in a second mode to sense the second input TC2 by the user's body 3000 in response to the control signal I-CS. That is, the sensor driver 200C may control the sensor layer 200 in the first mode or the second mode based on the mode determination signal.

The sensor driver 200C may calculate coordinate information of the first input TC1 or the second input TC2 based on the signal from the sensor layer 200 and may apply a coordinate signal I-SS having the coordinate information to the main controller 1000C. The main controller 1000C may perform an operation corresponding to the user's input based on the coordinate signal I-SS. For example, the main controller 1000C may drive the display driver 100C based on the coordinate signal I-SS to display a new application image through the display layer 100.

The input device 2000 may include a housing 2100, a power supply 2200, a controller 2300, a communication module 2400, and a pen electrode 2500. However, elements of the input device 2000 should not be limited to the above-mentioned elements. For example, the input device 2000 may further include an electrode switch to switch a signal transmission mode to a signal reception mode and vice versa, a pressure sensor to sense a pressure, a memory to store information, or a gyro sensor to sense a rotation.

The housing 2100 may have a pen shape and may include an accommodating space defined therein. The power supply 2200, the controller 2300, the communication module 2400, and the pen electrode 2500 may be accommodated in the accommodating space defined in the housing 2100.

The power supply 2200 may supply a power to modules in the input device 2000, e.g., the controller 2300, the communication module 2400, and the like. The power supply 2200 may include a battery or a high capacity capacitor.

The controller 2300 may control an operation of the input device 2000. The controller 2300 may be, but not limited to, an application-specific integrated circuit (ASIC). The controller 2300 may be configured to operate according to a designed program.

The communication module 2400 may include a receiver 2410 and a transmitter 2420. The receiver 2410 may receive the uplink signal ULS from the sensor layer 200. The sensor layer 200 may receive the uplink signal ULS from the sensor driver 200C. That is, the receiver 2410 may receive the uplink signal ULS from the sensor driver 200C.

When the receiver 2410 receives the uplink signal ULS, the controller 2300 may generate the downlink signal DLS in response to the uplink signal ULS. That is, when the input device 2000 receives the uplink signal ULS, the input device 2000 may generate the downlink signal DLS.

The transmitter 2420 may output the downlink signal DLS to the sensor layer 200. The downlink signal DLS may include the first downlink signals DLK1 (refer to FIG. 11) and the second downlink signals DLK1 (refer to FIG. 11).

The transmitter 2420 may receive a signal from the controller 2300 and may modulate the signal into a signal that is able to be sensed by the sensor layer 200, and the receiver 2410 may modulate a signal from the sensor layer 200 into a signal that is able to be processed by the controller 2300.

The pen electrode 2500 may be electrically connected to the communication module 2400. A portion of the pen electrode 2500 may be protruded from the housing 2100. In addition, the input device 2000 may further include a cover housing that covers the pen electrode 2500 exposed without being covered by the housing 2100. Alternatively, the pen electrode 2500 may be built in the housing 2100.

Figure 4A:
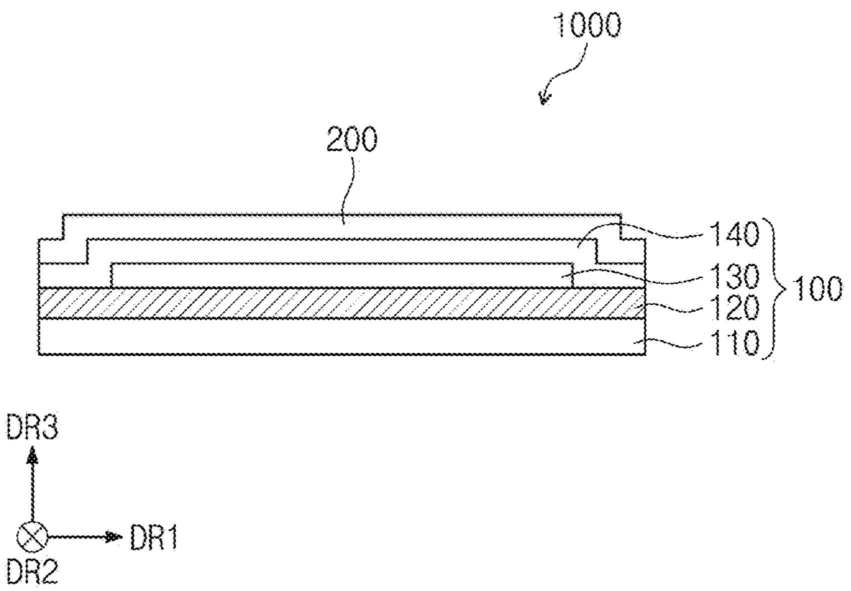
FIG. 4A is a cross-sectional view of an electronic device according to an embodiment of the present disclosure.

FIG. 4A is a cross-sectional view of the electronic device 1000 according to an embodiment of the present disclosure.

Referring to FIG. 4A, the electronic device 1000 may include the display layer 100 and the sensor layer 200. The display layer 100 may include a base layer 110, a circuit layer 120, a light emitting element layer 130, and an encapsulation layer 140.

The base layer 110 may provide a base surface on which the circuit layer 120 is disposed. The base layer 110 may be a glass substrate, a metal substrate, or a polymer substrate. However, the embodiment should not be limited thereto or thereby, and according to an embodiment, the base layer 110 may be an inorganic layer, an organic layer, or a composite material layer.

The base layer 110 may have a multi-layer structure. For instance, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a polyimide-based resin. In addition, each of the first and second synthetic resin layers may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. In the present disclosure, the term "X-based resin", as used herein, refers to the resin that includes a functional group of X.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a coating or depositing process. Then, the insulating layer, the semiconductor layer, and the conductive layer may be selectively patterned through several photolithography processes. The semiconductor pattern, the conductive pattern, and the signal line included in the circuit layer 120 may be formed through processes described above.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from moisture, oxygen, and a foreign substance such as dust particles.

The sensor layer 200 may be formed on the display layer 100 through successive processes. In this case, the sensor layer 200 may be disposed directly on the display layer 100. In the following descriptions, the expression "the sensor layer 200 is disposed directly on the display layer 100" means that no intervening elements are present between the sensor layer 200 and the display layer 100. That is, a separate adhesive member may not be disposed between the sensor layer 200 and the display layer 100. Alternatively, the sensor layer 200 may be coupled with the display layer 100 by an adhesive member. The adhesive member may be a conventional adhesive.

Figure 4B:
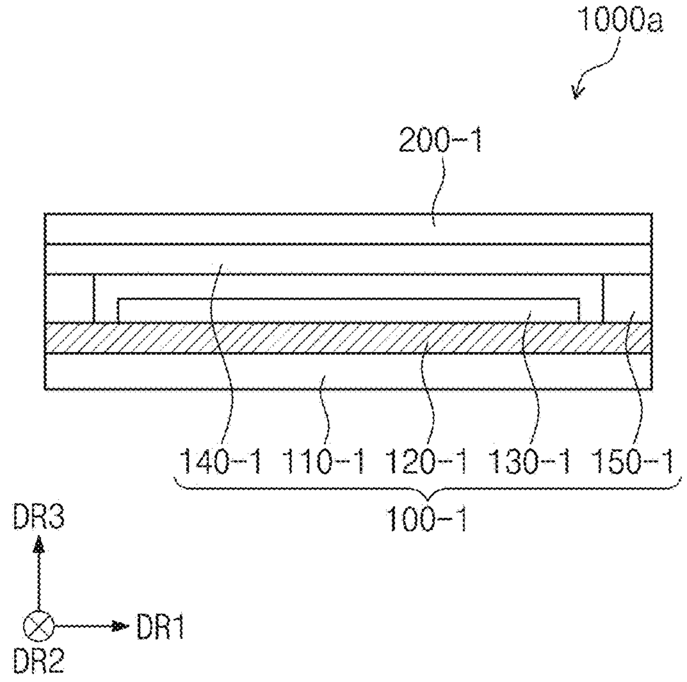
FIG. 4B is a cross-sectional view of an electronic device according to an embodiment of the present disclosure.

FIG. 4B is a cross-sectional view of an electronic device 1000*a* according to an embodiment of the present disclosure.

Referring to FIG. 4B, the electronic device 1000-1 may include a display layer 100-1 and a sensor layer 200-1. The display layer 100-1 may include a base substrate 110-1, a circuit layer 120-1, a light emitting element layer 130-1, an encapsulation substrate 140-1, and a coupling member 150-1.

Each of the base substrate 110-1 and the encapsulation substrate 140-1 may be a glass substrate, a metal substrate, or a polymer substrate, however, the embodiment should not be particularly limited.

The coupling member 150-1 may be disposed between the base substrate 110-1 and the encapsulation substrate 140-1. The encapsulation substrate 140-1 may be coupled with the base substrate 110-1 or the circuit layer 120-1 by the coupling member 150-1. The coupling member 150-1 may include an inorganic material or an organic material. For example, the inorganic material may include a frit seal, and the organic material may include a photocurable resin or a photoplastic resin. However, the material for the coupling member 150-1 should not be limited thereto or thereby.

The sensor layer 200-1 may be disposed directly on the encapsulation substrate 140-1. In the following descriptions, the expression "The sensor layer 200-1 is disposed directly on the encapsulation substrate 140-1." means that no intervening elements are present between the sensor layer 200-1 and the encapsulation substrate 140-1. That is, a separate adhesive member may not be disposed between the sensor layer 200-1 and the encapsulation substrate 140-1, however, it should not be limited thereto or thereby. According to an embodiment, an adhesive layer may be further disposed between the sensor layer 200-1 and the encapsulation substrate 140-1.

Figure 5:
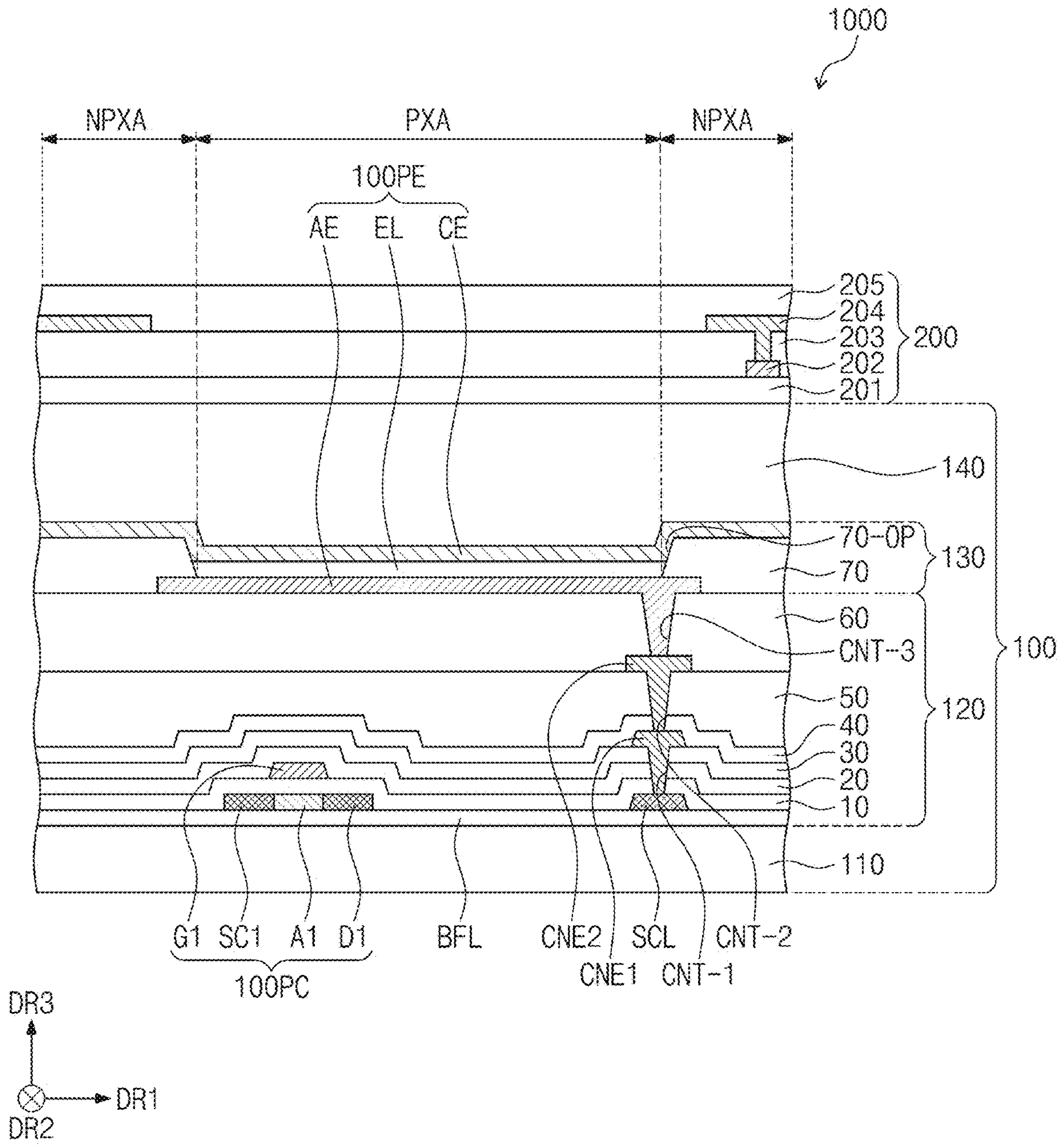
FIG. 5 is a cross-sectional view of an electronic device according to an embodiment of the present disclosure.

FIG. 5 is a cross-sectional view of the electronic device 1000 according to an embodiment of the present disclosure. In FIG. 5, the same reference numerals denote the same elements in FIG. 4A, and thus, detailed descriptions of the same elements will be omitted.

Referring to FIG. 5, at least one inorganic layer may be formed on an upper surface of the base layer 110. The inorganic layer may include at least one of aluminum oxide, titanium oxide, silicon oxide, silicon oxynitride, zirconium oxide, and hafnium oxide. The inorganic layer may be formed in multiple layers. The inorganic layers formed in multiple layers may form a barrier layer and/or a buffer layer. In the present embodiment, the display layer 100 may include a buffer layer BFL.

The buffer layer BFL may increase an adhesion between the base layer 110 and the semiconductor pattern. The buffer layer BFL may include a silicon oxide layer and a silicon nitride layer. The silicon oxide layer and the silicon nitride layer may be alternately stacked with each other.

The semiconductor pattern may be disposed on the buffer layer BFL. The semiconductor pattern may include polysilicon, however, it should not be limited thereto or thereby. The semiconductor pattern may include amorphous silicon, low-temperature polycrystalline silicon, or oxide semiconductor.

FIG. 5 shows only a portion of the semiconductor pattern, and the semiconductor pattern may be further disposed in other areas. The semiconductor pattern may be arranged with a specific rule over the pixels. The semiconductor pattern may have different electrical properties depending on whether it is doped or not. The semiconductor pattern may include a first region with high conductivity and a second region with low conductivity. The first region may be doped with an N-type dopant or a P-type dopant. A P-type transistor may include a doped region doped with the P-type dopant and an N-type transistor may include a doped region doped with the N-type dopant. The second region may be a non-doped region or may be doped at a concentration lower than the first region.

The first region may have a conductivity greater than that of the second region and may substantially serve as an electrode or signal line. The second region may substantially correspond to an active (or a channel) of a transistor. In other words, a portion of the semiconductor pattern may be the active of the transistor, another portion of the semiconductor pattern may be a source or a drain of the transistor, and the other portion of the semiconductor pattern may be a connection electrode or a connection signal line.

Each of the pixels may have an equivalent circuit that includes seven transistors, one capacitor, and the light emitting element, and the equivalent circuit of the pixels may be changed in various ways. FIG. 5 shows one transistor 100PC and the light emitting element 100PE included in the pixel.

The transistor 100PC may include a source SC1, an active A1, a drain D1, and a gate G1. The source SC1, the active A1, and the drain D1 may be formed of the semiconductor pattern. The source SC1 and the drain D1 may extend in opposite directions to each other from the active A1 in a cross-sectional view. FIG. 5 shows a portion of the connection signal line SCL formed of the semiconductor pattern.

Although not shown in figures, the connection signal line SCL may be electrically connected to the drain D1 of the transistor 100PC in a plan view.

A first insulating layer 10 may be disposed on the buffer layer BFL. The first insulating layer 10 may be commonly disposed in areas corresponding to the pixels and may cover the semiconductor pattern. The first insulating layer 10 may be an inorganic layer and/or an organic layer and may have a single-layer or multi-layer structure. The first insulating layer 10 may include at least one of aluminum oxide, titanium oxide, silicon oxide, silicon nitride, silicon oxynitride, zirconium oxide, and hafnium oxide. In the present embodiment, the first insulating layer 10 may have a single-layer structure of a silicon oxide layer. Not only the first insulating layer 10, but also an insulating layer of the circuit layer 120 described later may be an inorganic layer and/or an organic layer and may have a single-layer or multi-layer structure. The inorganic layer may include at least one of the above-mentioned materials, however, it should not be limited thereto.

The gate G1 may be disposed on the first insulating layer 10. The gate G1 may be a portion of a metal pattern. The gate G1 may overlap the active A1. The gate G1 may be used as a self-aligned mask in a process of doping the semiconductor pattern.

A second insulating layer 20 may be disposed on the first insulating layer 10 and may cover the gate G1. The second insulating layer 20 may be commonly disposed in areas corresponding to the pixels. The second insulating layer 20 may be an inorganic layer and/or an organic layer and may have a single-layer or multi-layer structure. The second insulating layer 20 may include at least one of silicon oxide, silicon nitride, and silicon oxynitride. In the present embodiment, the second insulating layer 20 may have a multi-layer structure of a silicon oxide layer and a silicon nitride layer.

A third insulating layer 30 may be disposed on the second insulating layer 20. The third insulating layer 30 may have a single-layer structure or a multi-layer structure. As an example, the third insulating layer 30 may have the multi-layer structure of a silicon oxide layer and a silicon nitride layer.

A first connection electrode CNE1 may be disposed on the third insulating layer 30. The first connection electrode CNE1 may be connected to the connection signal line SCL via a contact hole CNT-1 defined through the first, second, and third insulating layers 10, 20, and 30.

A fourth insulating layer 40 may be disposed on the third insulating layer 30. The fourth insulating layer 40 may have a single-layer structure of a silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 via a contact hole CNT-2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120 on the sixth insulating layer 60. The light emitting element layer 130 may include the light emitting element 100PE. For example, the light emitting element layer 130 may include an organic light emitting material, a quantum dot, a quantum rod, a micro-LED, or a nano-LED. Hereinafter, the organic light emitting element will be described as the light emitting element 100PE, however, the light emitting element 100PE should not be particularly limited.

The light emitting element 100PE may include a first electrode AE, a light emitting layer EL, and a second electrode CE. The first electrode AE may be disposed on the sixth insulating layer 60. The first electrode AE may be connected to the second connection electrode CNE2 via a contact hole CNT-3 defined through the sixth insulating layer 60.

A pixel definition layer 70 may be disposed on the sixth insulating layer 60 and may cover a portion of the first electrode AE. An opening 70-OP may be defined through the pixel definition layer 70. At least a portion of the first electrode AE may be exposed through the opening 70-OP of the pixel definition layer 70.

The active area 1000A (refer to FIG. 1) may include a light emitting area PXA and a non-light-emitting area NPXA disposed adjacent to the light emitting area PXA. The non-light-emitting area NPXA may surround the light emitting area PXA. In the present embodiment, the light emitting area PXA may correspond to the portion of the first electrode AE exposed through the opening 70-OP.

The light emitting layer EL may be disposed on the first electrode AE. The light emitting layer EL may be disposed in an area corresponding to the opening 70-OP. That is, the light emitting layer EL may be formed in each of the pixels to be spaced apart from adjacent pixel. In the case where the light emitting layer EL is formed in each of the pixels to be spaced apart from adjacent pixel, each of the light emitting layers EL may emit a light having at least one of blue, red, and green colors, however, it should not be limited thereto or thereby. The light emitting layer EL may be commonly provided in areas corresponding to the pixels. In this case, the light emitting layer EL may provide a blue light or a white light.

The second electrode CE may be disposed on the light emitting layer EL. The second electrode CE may have an integral shape and may be commonly disposed in areas corresponding to the pixels.

Although not shown in figures, a hole control layer may be disposed between the first electrode AE and the light emitting layer EL. The hole control layer may be commonly disposed in the light emitting area PXA and the non-light-emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in the plural pixels using an open mask.

The encapsulation layer 140 may be disposed on the light emitting element layer 130. The encapsulation layer 140 may include an inorganic layer, an organic layer, and an inorganic layer, which are sequentially stacked, however, layers of the encapsulation layer 140 should not be limited thereto or thereby.

The inorganic layers may protect the light emitting element layer 130 from moisture and oxygen, and the organic layer may protect the light emitting element layer 130 from a foreign substance such as dust particles. Each of the inorganic layers may include a silicon nitride layer, a silicon oxynitride layer, a silicon oxide layer, a titanium oxide layer, or an aluminum oxide layer. The organic layer may include an acrylic-based organic layer, however, it should not be limited thereto or thereby.

The sensor layer 200 may be formed on the display layer 100 through successive processes. That is, the sensor layer 200 may be disposed directly on the display layer 100. In the present disclosure, the expression "the sensor layer 200 is disposed directly on the display layer 100." means that no intervening elements are present between the sensor layer 200 and the display layer 100. That is, a separate adhesive member may not be disposed between the sensor layer 200 and the display layer 100. Alternatively, the sensor layer 200 may be coupled with the display layer 100 by the adhesive member. The adhesive member may be the conventional adhesive.

The sensor layer 200 may include a base insulating layer 201, a first conductive layer 202, a sensing insulating layer 203, a second conductive layer 204, and a cover insulating layer 205.

The base insulating layer 201 may be an inorganic layer that includes at least one of silicon nitride, silicon oxynitride, and silicon oxide. Alternatively, the base insulating layer 201 may be an organic layer that includes an epoxy-based resin, an acrylic-based resin, or an imide-based resin. The base insulating layer 201 may have a single-layer structure or a multi-layer structure of layers stacked one on another in the third direction DR3.

Each of the first conductive layer 202 and the second conductive layer 204 may have a single-layer structure or a multi-layer structure of layers stacked in the third direction DR3.

The conductive layer having the single-layer structure may include a metal layer or a transparent conductive layer. The metal layer may include molybdenum, silver, titanium, copper, aluminum, or alloys thereof. The transparent conductive layer may include a transparent conductive oxide, such as indium tin oxide (ITO), indium zinc oxide (IZO), zinc oxide (ZnO), indium zinc tin oxide (IZTO), or the like. In addition, the transparent conductive layer may include a conductive polymer such as PEDOT, a metal nanowire, a graphene, or the like.

The conductive layer having the multi-layer structure may include metal layers. The metal layers may have, for example, a three-layer structure of titanium/aluminum/titanium. The conductive layer having the multi-layer structure may include at least one metal layer and at least one transparent conductive layer.

At least one of the sensing insulating layer 203 and the cover insulating layer 205 may include an inorganic layer. The inorganic layer may include at least one of aluminum oxide, titanium oxide, silicon oxide, silicon nitride, silicon oxynitride, zirconium oxide, and hafnium oxide.

At least one of the sensing insulating layer 203 and the cover insulating layer 205 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

Figure 6:
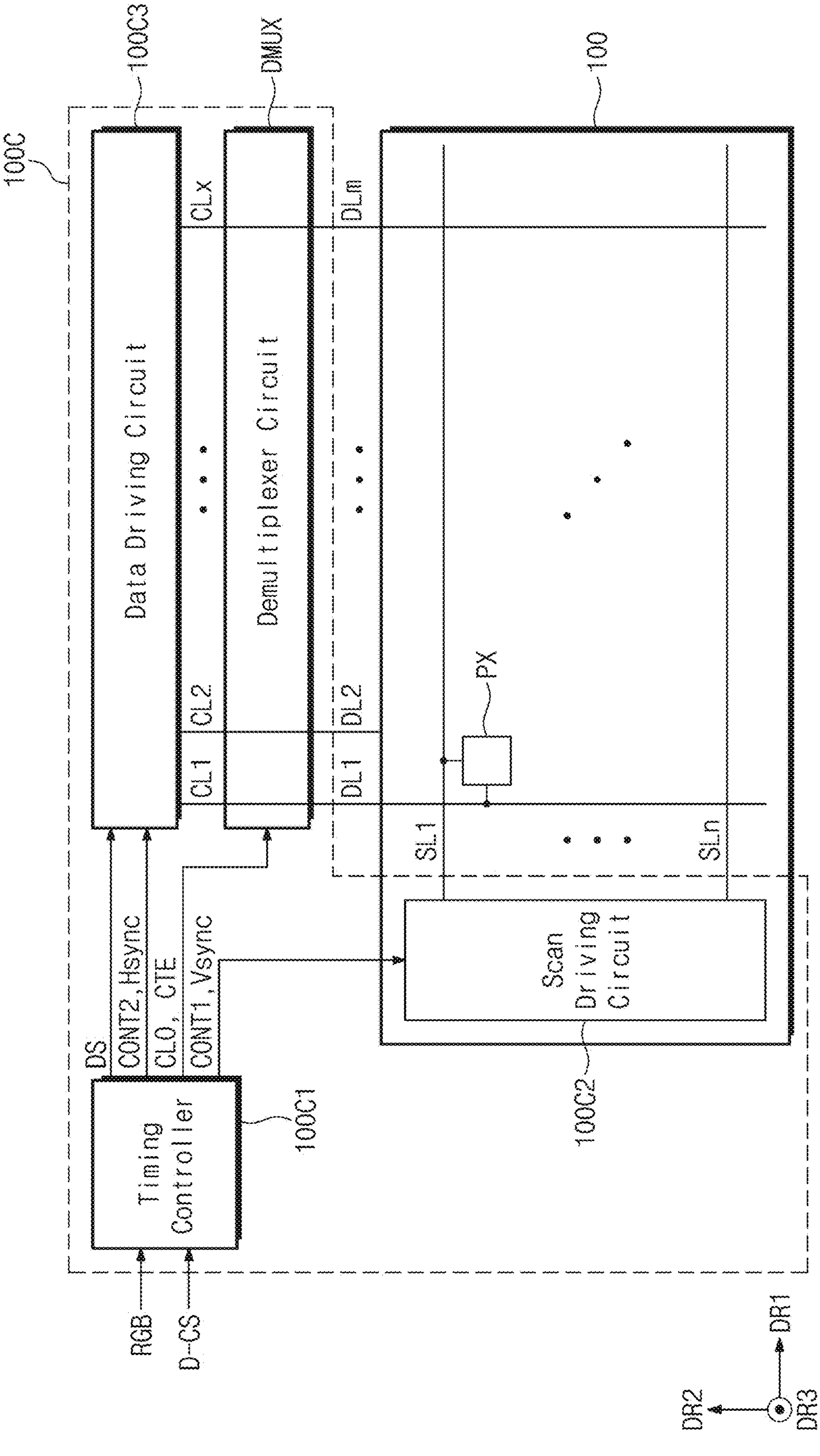
FIG. 6 is a block diagram of a display layer and a display driver according to an embodiment of the present disclosure.

FIG. 6 is a block diagram of the display layer 100 and the display driver 100C according to an embodiment of the present disclosure.

Referring to FIG. 6, the display layer 100 may include a plurality of scan lines SL1 to SLn, a plurality of data lines DL1 to DLm, and a plurality of pixels PX. Each of the pixels PX may be connected to a corresponding data line of the data lines DL1 to DLm and a corresponding scan line of the scan lines SL1 to SLn. The pixels PX may include first, second, and third pixels PX1, PX2, and PX3 (refer to FIG. 7). According to an embodiment, the display layer 100 may further include light emission control lines, and the display driver 100C may further include a light emission driving circuit applying control signals to the light emission control lines. Configurations of the display layer 100 should not be particularly limited.

The display driver 100C may include a timing controller 100C1, a scan driving circuit 100C2, a data driving circuit 100C3, and a demultiplexer circuit DMUX.

The timing controller 100C1 may receive the image data RGB and the control signal D-CS from the main controller 1000C (refer to FIG. 3). The control signal D-CS may include a variety of signals. As an example, the control signal D-CS may include the input vertical synchronization signal, the input horizontal synchronization signal, the main clock, and the data enable signal.

The timing controller 100C1 may generate a first control signal CONT1 and the vertical synchronization signal Vsync based on the control signal D-CS and may output the first control signal CONT1 and the vertical synchronization signal Vsync to the scan driving circuit 100C2. The vertical synchronization signal Vsync may be included in the first control signal CONT1.

The timing controller 100C1 may generate a second control signal CONT2 and the horizontal synchronization signal Hsync based on the control signal D-CS and may output the second control signal CONT2 and the horizontal synchronization signal Hsync to the data driving circuit 100C3. The horizontal synchronization signal Hsync may be included in the second control signal CONT2.

The timing controller 100C1 may output an image data signal DS obtained by processing the image data RGB according to an operational condition of the display layer 100 to the data driving circuit 100C3. The first control signal CONT1 and the second control signal CONT2 may be signals required for an operation of the scan driving circuit 100C2 and the data driving circuit 100C3 and should not be particularly limited.

The timing controller 100C1 may generate a first line control signal CLO and a second line control signal CLE based on the control signal D-CS and may output the first line control signal CLO and the second line control signal CLE to the demultiplexer circuit DMUX.

The scan driving circuit 100C2 may transmit signals to the scan lines SL1 to SLn in response to the first control signal CONT1 and the vertical synchronization signal Vsync. According to an embodiment, the scan driving circuit 100C2 may be formed through the same process as the circuit layer 120 (refer to FIG. 5) of the display layer 100, however, it should not be limited thereto or thereby. As an example, the scan driving circuit 100C2 may be directly mounted on a predetermined area of the display layer 100 after being implemented in an integrated circuit (IC) or may be electrically connected to the display layer 100 after being mounted on a separate printed circuit board in a chip-on-film (COF) method.

The data driving circuit 100C3 may output data signals to drive the pixels PX in response to the second control signal CONT2, the horizontal synchronization signal Hsync, and the image data signal DS from the timing controller 100C1. The electronic device 1000 may further include a plurality of channel lines CL1 to CLx. In the present embodiment, the x is an integer number greater than 1 and smaller than the m. The data signal may be applied to the demultiplexer circuit DMUX through the channel lines CL1 to CLx. The data driving circuit 100C3 may be directly mounted on a predetermined area of the display layer 100 after being implemented in an integrated circuit (IC) or may be electrically connected to the display layer 100 after being mounted on a separate printed circuit board in a chip-on-film (COF) method, however, it should not be limited thereto or thereby. For example, the data driving circuit 100C3 may be formed through the same process as the circuit layer 120 (refer to FIG. 5) of the display layer 100.

The demultiplexer circuit DMUX may be electrically connected between the data driving circuit 100C3 and the display layer 100. The channel lines CL1 to CLx may be selectively electrically connected to the data lines DL1-DLm through the demultiplexer circuit DMUX. The number of the channel lines CL1 to CLx may be smaller than the number of the data lines DL1 to DLm. In the present embodiment, a first channel line CL1 may be electrically connected to a first data line DL1. The first data line DL1 may include a first-first data line DL1-1 (refer to FIG. 7) and a first-second data line DL1-2 (refer to FIG. 7). The first channel line CL1 may be selectively connected to the first-first data line DL1-1 (refer to FIG. 7) or the first-second data line DL1-2 (refer to FIG. 7) in response to the first line control signal CLO and the second line control signal CLE.

FIG. 6 shows a structure in which the demultiplexer circuit DMUX is implemented as a separate integrated circuit as a representative example, however, the present disclosure should not be particularly limited. As an example, the demultiplexer circuit DMUX may be included in the data driving circuit DDC, may be included in the display layer 100, or may be integrated in a printed circuit board on which the data driving circuit 100C3 is mounted.

According to the present embodiment, the number of channel s of data output from the data driving circuit 100C3 may be smaller than the number of the data lines DL1 to DLm by the demultiplexer circuit DMUX. The number of the channels may correspond to the number of the channel lines CL1 to CLx. In this case, the number of IC chips that includes the data driving circuit 100C3 included in the electronic device 1000-1 with a large display layer 100 as shown in FIG. 2 may be reduced as the number of the channels decreases. In addition, as the number of the channels of one IC chip including the data driving circuit 100C3 decreases, the cost of the IC chip may be reduced.

Figure 7:
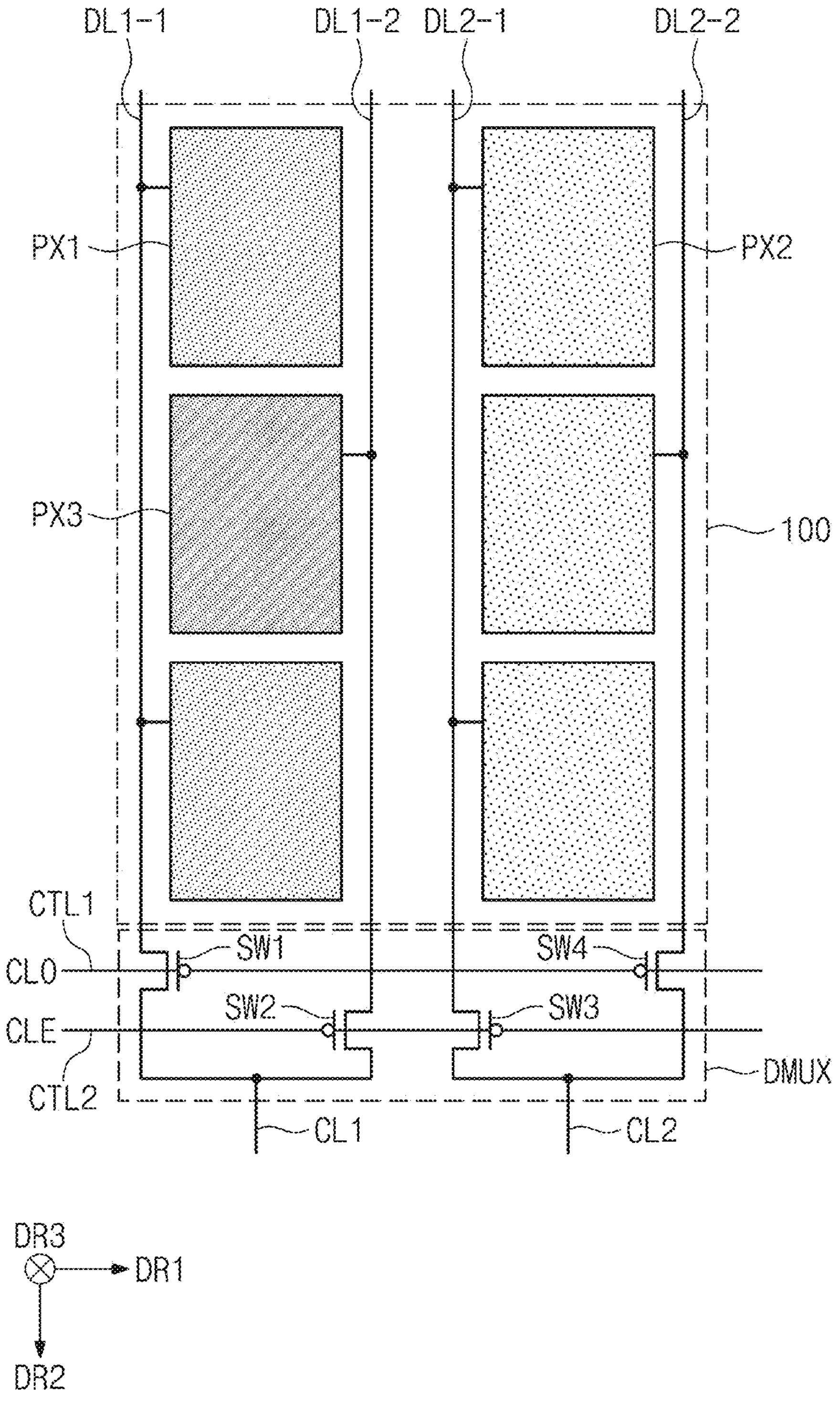
FIG. 7 is a plan view of a portion of a display layer and a portion of a demultiplexer circuit according to an embodiment of the present disclosure.

FIG. 7 is a plan view of a portion of the display layer 100 and a portion of the demultiplexer circuit DMUX according to an embodiment of the present disclosure.

Referring to FIGS. 6 and 7, the electronic device 1000 may include the display layer 100 and the demultiplexer circuit DMUX.

FIG. 7 shows the first, second, and third pixels PX1, PX2, and PX3, the first-first, first-second, second-first, and second-second data lines DL1-1, DL1-2, DL2-1, and DL2-2, the demultiplexer circuit DMUX, and the first and second channel lines CL1 and CL2 as a representative example.

The first pixel PX1 may emit a light having a first color. The second pixel PX2 may emit a light having a second color. The third pixel PX3 may emit a light having a third color. The first color may be red, the second color may be green, and the third color may be blue.

Each of the first, second, and third pixels PX1, PX2, and PX3 may be provided in plural and may be repeatedly arranged in a predetermined arrangement. As an example, the first pixels PX1 may be alternately arranged with the third pixels PX3 in the second direction DR2 in a first column. The second pixels PX2 may be arranged in the second direction DR2 in a second column.

The first pixel PX1 may be electrically connected to the first-first data line DL1-1. The second pixel PX2 arranged in an odd-numbered row may be electrically connected to the second-first data line DL2-1, and the second pixel PX2 arranged in an even-numbered row may be electrically connected to the second-second data line DL2-2. The third pixel PX3 may be electrically connected to the first-second data line DL1-2.

The demultiplexer circuit DMUX may be disposed spaced apart from the display layer 100 in the second direction DR2. The demultiplexer circuit DMUX may include first and second line control lines CTL1 and CTL2 and first, second, third, and fourth switches SW1, SW2, SW3, and SW4.

The demultiplexer circuit DMUX may receive the first line control signal CLO and the second line control signal CLE through the first and second line control lines CTL1 and CTL2. The demultiplexer circuit DMUX may receive the data signal from the data driving circuit 100C3 through the channel lines CL1 and CL2.

The first to fourth switches SW1 to SW4 may be electrically connected to the first-first to second-second data lines DL1-1 to DL2-2, respectively.

The first switch SW1 may be connected between the first-first data line DL1-1 and the data driving circuit 100C3. The second switch SW2 may be connected between the first-second data line DL1-2 and the data driving circuit 100C3. The third switch SW3 may be connected between the second-first data line DL2-1 and the data driving circuit 100C3. The fourth switch SW4 may be connected between the second-second data line DL2-2 and the data driving circuit 100C3.

When the demultiplexer circuit DMUX receives the first line control signal CLO that is activated, the first and fourth switches SW1 and SW4 may be activated, and the data signal may be applied to the first pixel PX1 and the second pixel PX2 arranged in the even-numbered row.

When the demultiplexer circuit DMUX receives the second line control signal CLE that is activated, the second and third switches SW2 and SW3 may be activated, and the data signal may be applied to the third pixel PX3 and the second pixel PX2 arranged in the odd-numbered row.

Figure 8:
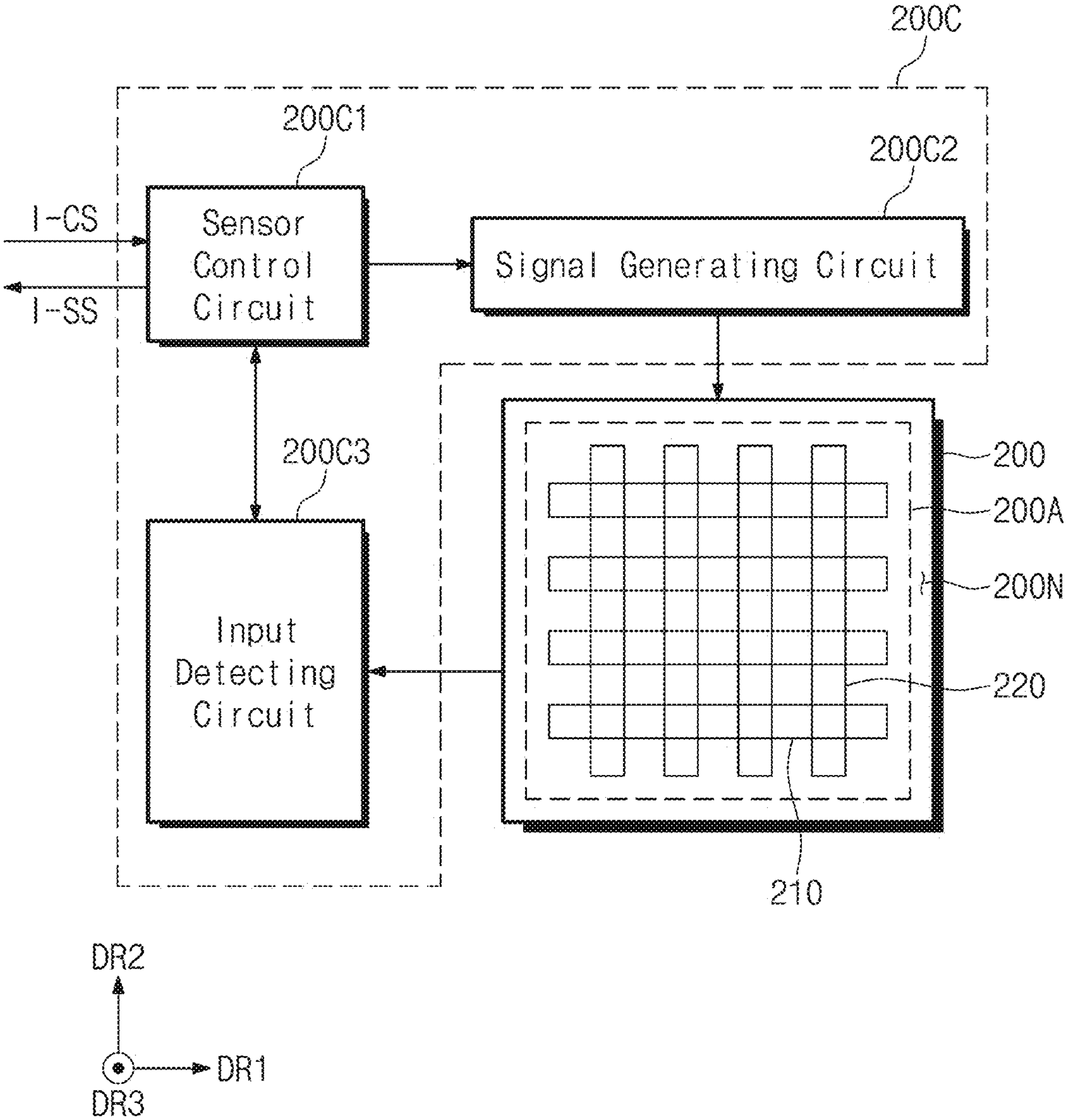
FIG. 8 is a block diagram of a sensor layer and a sensor driver according to an embodiment of the present disclosure.

FIG. 8 is a block diagram of the sensor layer 200 and the sensor driver 200C according to an embodiment of the present disclosure.

Referring to FIG. 8, the sensor layer 200 may include an active area 200A and a peripheral area 200N. The active area 200A may be activated in response to an electrical signal. For example, the active area 200A may be an area to sense the input. The active area 200A may overlap the active area 1000A (refer to FIG. 1) of the electronic device 1000 (refer to FIG. 1). The peripheral area 200N may surround the active area 200A. The peripheral area 200N may overlap the peripheral area 1000NA (refer to FIG. 1) of the electronic device 1000 (refer to FIG. 1).

The sensor layer 200 may include a plurality of first electrodes 210 and a plurality of second electrodes 220. Each of the first electrodes 210 may extend in the first direction DR1 and the first electrodes 210 may be arranged in the second direction DR2 to be spaced apart from each other. Each of the second electrodes 220 may extend in the second direction DR2 and the second electrodes 220 may be arranged in the first direction DR1 to be spaced apart from each other.

The second electrodes 220 may be insulated from the first electrodes 210 while intersecting the first electrodes 210. Each of the first electrodes 210 and each of the second electrodes 220 may have a bar shape or a stripe shape. When the first electrodes 210 and the second electrodes 220 have the bar shape or the stripe shape, sensing characteristics with respect to continuous linear inputs may be improved. However, the shape of the first electrodes 210 and the shape of the second electrodes 220 should not be limited to the bar shape or the stripe shape.

The sensor controller 200C may receive the control signal I-CS from the main controller 1000C (refer to FIG. 3) and may apply the coordinate signal I-SS to the main controller 1000C.

The sensor controller 200C may include a sensor control circuit 200C1, a signal generating circuit 200C2, and an input detecting circuit 200C3. The sensor control circuit 200C1, the signal generating circuit 200C2, and the input detecting circuit 200C3 may be implemented in a single chip, or some of the sensor control circuit 200C1, the signal generating circuit 200C2, and the input detecting circuit 200C3 may be implemented in a different chip from the other of the sensor control circuit 200C1, the signal generating circuit 200C2, and the input detecting circuit 200C3.

The sensor control circuit 200C1 may control an operation of the signal generating circuit 200C2, may calculate coordinates of the external input based on a sensing signal applied thereto from the input detecting circuit 200C3, or may analyze information provided from the input device 2000 (refer to FIG. 3) based on a modulated signal applied thereto from the input detecting circuit 200C3.

The signal generating circuit 200C2 may apply an output signal (or a driving signal) that is called a TX signal to the sensor layer 200. The signal generating circuit 200C2 may output the output signal corresponding to an operational mode to sensor layer 200.

The input detecting circuit 200C3 may convert an analog signal (or a sensing signal) that is called an RX signal provided from the sensor layer 200 to a digital signal. The input detecting circuit 200C3 may amplify the received analog signal and may filter the amplified signal. The input detecting circuit 200C3 may convert the filtered signal to the digital signal.

The sensor layer 200 may sense the second input TC2 (refer to FIG. 3) by a self-capacitance manner and a mutual capacitance manner. This will be described in detail later.

Figure 9:
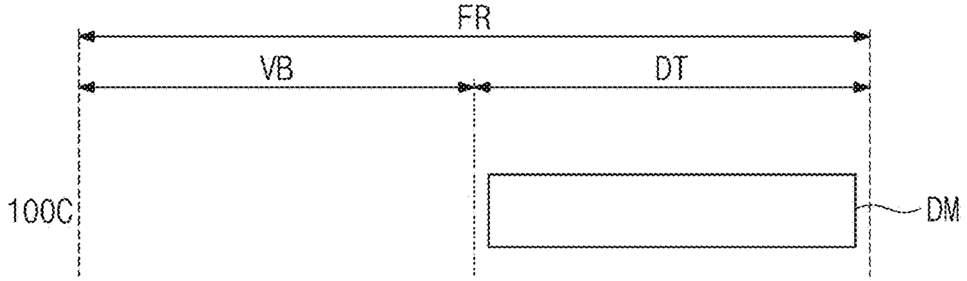
FIG. 9 is a view illustrating an operation of a display driver according to an embodiment of the present disclosure.

FIG. 9 is a view illustrating an operation of the display driver according to an embodiment of the present disclosure.

Referring to FIGS. 6, 7, and 9, the display layer 100 may operate in the unit of display frame FR.

The display driver 100C may receive the image data RGB from the main controller 1000C (refer to FIG. 3). The image data RGB may be provided to correspond to a driving frequency of the display frame FR. The driving frequency of the display frame FR may be about 120 Hz, however, the present disclosure should not be limited thereto or thereby.

The display frame FR may include a blank period VB and a data period DT. The blank period VB and the data period DT may have substantially the same length as each other. The blank period VB and the data period DT may have a driving frequency of about 240 Hz, but they should not be particularly limited. In addition, FIG. 9 shows that the data period DT is provided after the blank period VB as a representative example, however, the operation of the display frame FR according to the present disclosure should not be limited thereto or thereby. As an example, the data period DT may precede the blank period VB.

During the blank period VB, the display driver 100C may not apply signals to the data lines DL1 to DLm and the scan lines SL1 to SLn. Accordingly, the blank period VB may be defined as a period that holds the image IM (refer to FIG. 1) displayed during a previous data period DT.

The timing controller 100C1 may convert the image data RGB to generate the image data signal DS. The timing controller 100C1 may provide the image data signal DS to correspond to a driving frequency of the data period DT by taking into account of the output line of the demultiplexer circuit DMUX. As an example, when two data lines DL1-1 and DL1-2 are connected to one channel line CL1 by the demultiplexer circuit DMUX, the image data signal DS may be provided for a period corresponding to a half of a period for the image data RGB.

During the data period DT, the display driver 100C may operate in a data providing mode DM. During the data providing mode DM, the display driver 100C may apply corresponding signals to the data lines DL1 to DLm and the scan lines SL1 to SLn to allow data signals to be provided to the pixels PX. During the data period DT, the image data signal DS may be applied to the display layer 100, and thus, the image IM (refer to FIG. 1) may be displayed.

Figure 10:
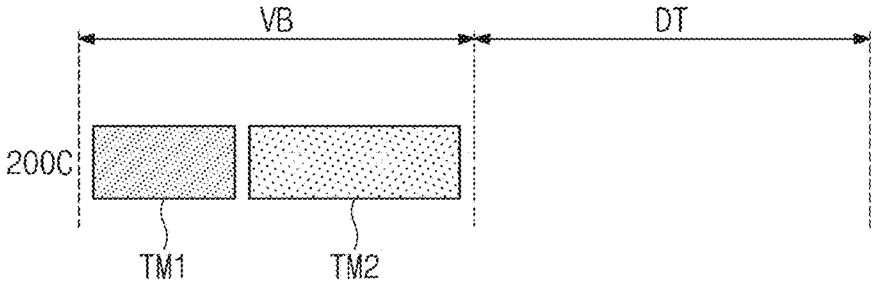
FIG. 10 is a view illustrating an operation of a sensor driver according to an embodiment of the present disclosure.

FIG. 10 is a view illustrating an operation of the sensor driver 200C according to an embodiment of the present disclosure. In FIG. 10, the same reference numerals denote the same elements in FIG. 9, and thus, detailed descriptions of the same elements will be omitted.

Referring to FIGS. 3, 9, and 10, the sensor driver 200C may drive the sensor layer 200 to operate in the second mode during the blank period VB. That is, the sensor layer 200 may operate in the second mode during the blank period VB.

The second mode may be a mode in which the second input TC2 generated by the user's body 3000 is sensed. The second mode may include a first touch mode TM1 and a second touch mode TM2.

In the first touch mode TM1, the sensor driver 200C may drive the sensor layer 200 to operate in the self-capacitance manner. In the first touch mode TM1, the sensor layer 200 may sense the user's body 3000 based on a self-capacitance. That is, the first touch mode TM1 may be referred to as the self-capacitance manner.

In the self-capacitance manner, the signal generating circuit 200C2 may apply a first output signal to the first electrode 210 and may apply a second output signal to the second electrode 220. The input detecting circuit 200C3 may receive a first sensing signal generated in response the first output signal in the first electrode 210 and may receive a second sensing signal generated in response the second output signal in the second electrode 220. The sensor driver 200C may generate the coordinate signal I-SS based on the first sensing signal and the second sensing signal.

In the second touch mode TM2, the sensor driver 200C may drive the sensor layer 200 to operate in the mutual capacitance manner. In the second touch mode TM2, the sensor layer 200 may sense the user's body 3000 based on a mutual capacitance. That is, the second touch mode TM2 may be referred to as the mutual capacitance manner.

In the mutual capacitance manner, the signal generating circuit 200C2 may apply a third output signal to the first electrode 210 or the second electrode 220. The input detecting circuit 200C3 may receive a third sensing signal generated by the first electrode 210 and the second electrode 220 which are capacitively coupled with each other. The sensor driver 200C may generate the coordinate signal I-SS based on the third sensing signal.

During the data period DT, the sensor driver 200C may not drive the sensor layer 200. That is, the sensor driver 200C may sense the user's body 3000 using the sensor layer 200 only in the blank period VB.

According to the present disclosure, the sensor layer 200 that operates in the second mode may use both the self-capacitance manner and the mutual capacitance manner to sense the second input TC2 in the blank period VB. The sensor driver 200C may sense coordinates of the second input TC2 based on the sensing signal in the self-capacitance manner and the mutual capacitance manner. Accordingly, a touch reliability of the second input TC2 may be improved, and thus, a sensing reliability of the electronic device 1000 may be improved.

In addition, according to the present disclosure, since the image data signal DS is applied to the display layer 100 during the data period DT, the data period DT may be a period in which noise caused by the image data signal DS is relatively large. On the other hand, since the image data signal DS is not applied to the display layer 100 during the blank period VB, the blank period VB may be a period (or a noise free period) in which noise caused by the image data signal DS is relatively small. The sensor driver 200C may drive the sensor layer 200 to operate in the second mode during the blank period VB, and the display driver 100C may operate in the data providing mode DM during the data period DT. The sensor driver 200C may sense the second input TC2 in the blank period VB in which the display driver 100C is not driven. Accordingly, noise generated in each of the display layer 100 and the sensor layer 200 may be reduced. As a result, the display reliability and the sensing reliability of the electronic device 1000 may be improved.

Figure 11:
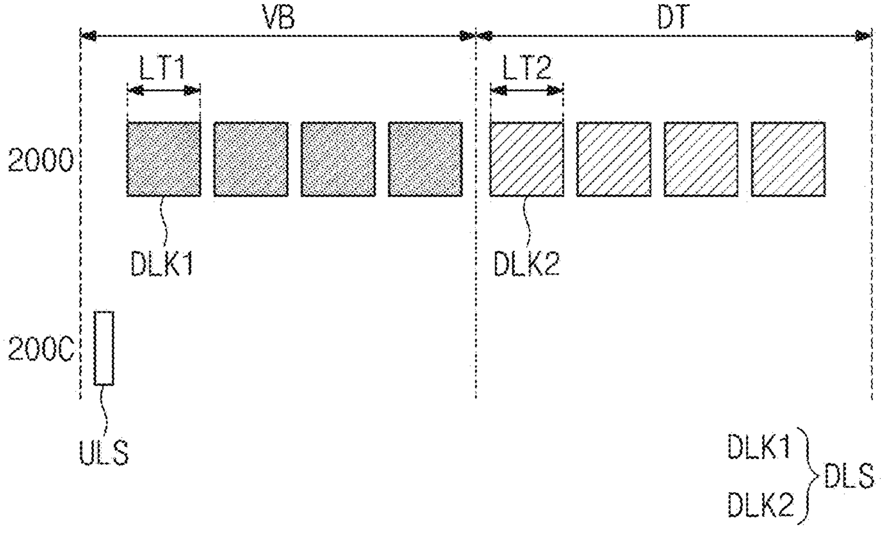
FIG. 11 is a view illustrating an operation of a sensor driver according to an embodiment of the present disclosure.

FIG. 11 is a view illustrating an operation of the sensor driver 200C according to an embodiment of the present disclosure. In FIG. 11, the same reference numerals denote the same elements in FIG. 9, and thus, detailed descriptions of the same elements will be omitted.

Referring to FIGS. 3 and 11, the sensor driver 200C may drive the sensor layer 200 to operate in the first mode during the blank period VB and the data period DT. The sensor layer 200 may operate in the first mode during the blank period VB and the data period DT. The first mode may be a mode in which the first input TC1 generated by the input device 2000 is sensed.

The sensor driver 200C may transmit the uplink signal ULS to the input device 2000 in the blank period VB. The input device 2000 may receive the uplink signal ULS and may generate the downlink signal DLS. The input device 2000 may transmit the downlink signal DLS to the sensor driver 200C through the sensor layer 200. The downlink signal DLS may include a plurality of first downlink signals DLK1 and a plurality of second downlink signals DLK2.

The sensor driver 200C may receive the first downlink signals DLK1 during the blank period VB. One first downlink signal DLK1 may be applied to the sensor driver 200C through the sensor layer 200 during a first link period LT1. The sensor driver 200C may successively receive the first downlink signals DLK1 during the blank period VB. As an example, the sensor driver 200C may receive only the first downlink signals DLK1 from the input device 2000 during the blank period VB.

FIG. 11 shows the state in which the sensor driver 200C receives four first downlink signals DLK1, however, the number of the first downlink signals DLK1 should not be limited thereto or thereby.

Each of the first downlink signals DLK1 may include first information. The first information may include information about the input device 2000. As an example, the first information may include information about a battery and a pen pressure of the input device 2000. In addition, the first information may include information about identification (ID) of the input device 2000. The electronic device 1000 may determine whether to receive a signal from the input device 2000 by distinguishing the identification (ID) of the input device 2000.

The sensor driver 200C may receive the second downlink signals DLK2 during the data period DT. One second downlink signal DLK2 may be applied to the sensor driver 200C through the sensor layer 200 during a second link period LT2. The sensor driver 200C may successively receive the second downlink signals DLK2 during the data period DT. As an example, the sensor driver 200C may receive only the second downlink signals DLK2 from the input device 2000 during the data period DT.

FIG. 11 shows the state in which the sensor driver 200C receives four second downlink signals DLK2, however, the number of the second downlink signals DLK2 should not be limited thereto or thereby.

The second downlink signals DLK2 may include second information different from the first information. The second information may include a signal for determining coordinate information of the input device 2000.

Figure 12A:
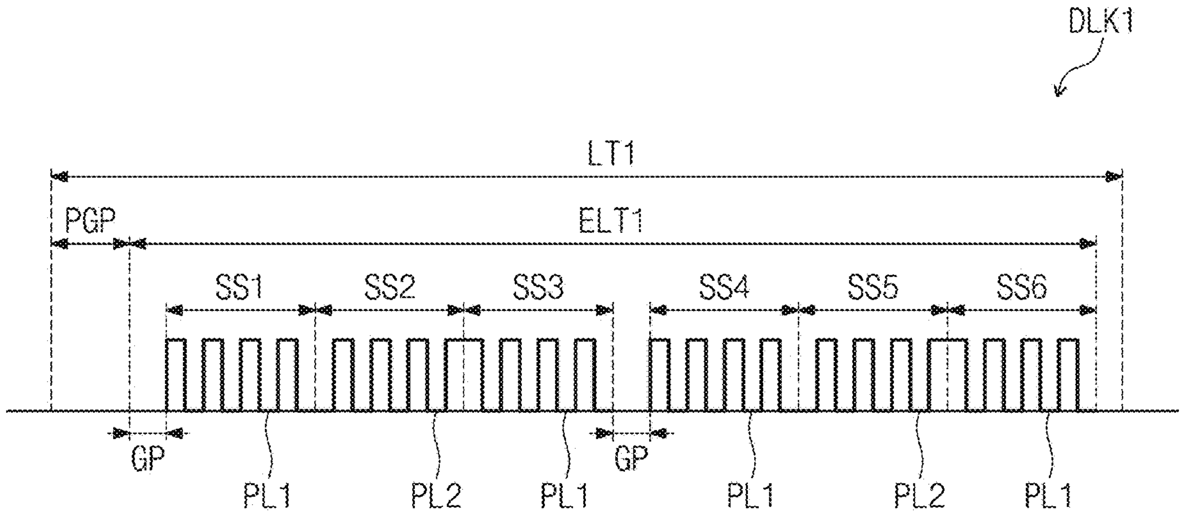
FIG. 12A is a graph illustrating a waveform of a first downlink signal according to an embodiment of the present disclosure.
Figure 12B:
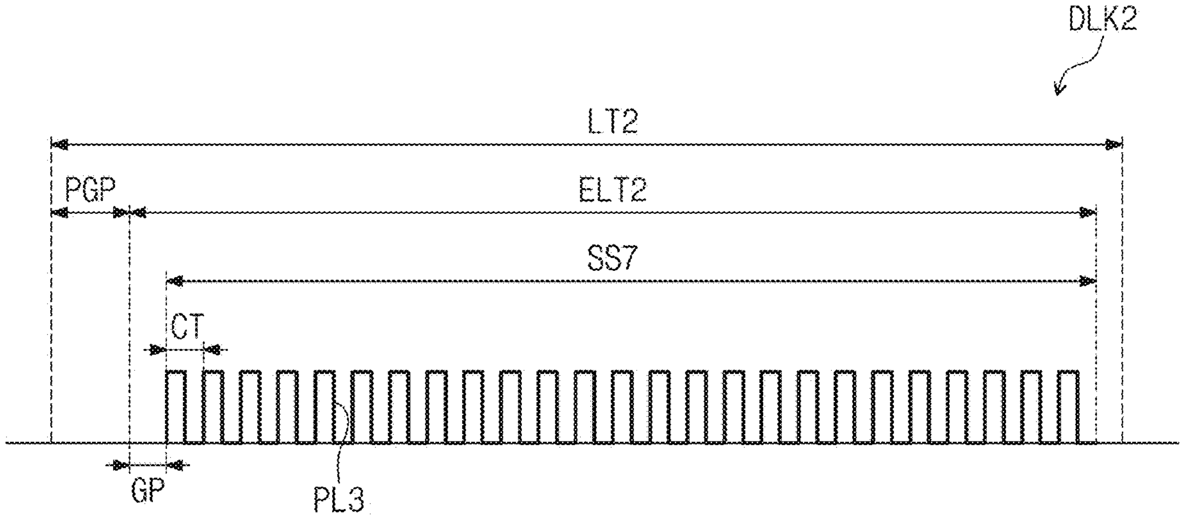
FIG. 12B is a graph illustrating a waveform of a second downlink signal according to an embodiment of the present disclosure.

FIG. 12A is a graph illustrating a waveform of the first downlink signal DLK1 according to an embodiment of the present disclosure. FIG. 12B is a graph illustrating a waveform of the second downlink signal DLK2 according to an embodiment of the present disclosure. In FIGS. 12A and 12B, the same reference numerals denote the same elements in FIG. 11, and thus, detailed descriptions of the same elements will be omitted.

Referring to FIGS. 11, 12A, and 12B, one first downlink signal DLK1 may include the first link period LT1.

The first link period LT1 may include a free gap period PGP and a first effective period ELT1. The free gap period PGP may be a period in which the first information is prepared. The first effective period ELT1 may be a period in which the first information is provided.

The first effective period ELT1 may include first, second, third, fourth, fifth, and sixth periods SS1, SS2, SS3, SS4, SS5, and SS6 and a plurality of gap periods GP. In the first period SS1, the first downlink signal DLK1 may be coded to have a first waveform PL1. As an example, the first waveform PL1 may represent 0 bit. The first waveform PL1 may include a rising edge and a falling edge.

In the second period SS2, the first downlink signal DLK1 may be coded to have a second waveform PL2 different from the first waveform PL1. As an example, the second waveform PL2 may represent 1 bit. The second waveform PL2 may be the same as a waveform obtained by shifting the first waveform PL1 by a predetermined phase. The second waveform PL2 may include a rising edge and a falling edge.

In the third period SS3, the first downlink signal DLK1 may be coded to have the first waveform PL1.

In the fourth period SS4, the first downlink signal DLK1 may be coded to have the first waveform PL1.

In the fifth period SS5, the first downlink signal DLK1 may be coded to have the second waveform PL2.

In the sixth period SS6, the first downlink signal DLK1 may be coded to have the first waveform PL1.

The gap period GP may be disposed between the free gap period PGP and the first period SS1 and between the third period SS3 and the fourth period SS4. The gap period GP may serve as a basis for dividing the coded signal according to a predetermined basis. As an example, the first to sixth periods SS1 to SS6 may be divided into the first to third periods SS1 to SS3 and the fourth to sixth periods SS4 to SS6 in FIG. 12A. The first to third periods SS1 to SS3 may represent 010 bits and the fourth to sixth periods SS4 to SS6 may represent 010 bits.

FIG. 12A shows six bits as a representative example, but the present disclosure should not be limited thereto or thereby. As an example, the first downlink signal DLK1 may include information corresponding to 8 bits.

One second downlink signal DLK2 may include the second link period LT2. The second link period LT2 may include a free gap period PGP and a second effective period ELT2. The free gap period PGP may be a period in which the second information is prepared. The second link period LT2 may be a period in which the second information is substantially provided.

The second effective period ELT2 may include a seventh period SS7 and a gap period GP. In the seventh period SS7, the second downlink signal DLK2 may have a third waveform PL3 that operates in a burst mode. The burst mode may be a mode in which a burst signal is provided. The burst signal may refer to a signal where a time interval between two adjacent signal occurrences is within a pre-specified time interval.

The third waveform PL3 may have a first driving period CT. The third waveform PL3 may include a rising edge and a falling edge. Each of the plurality of second downlink signals DLK2 may have substantially the same first driving period CT.

Figure 13:
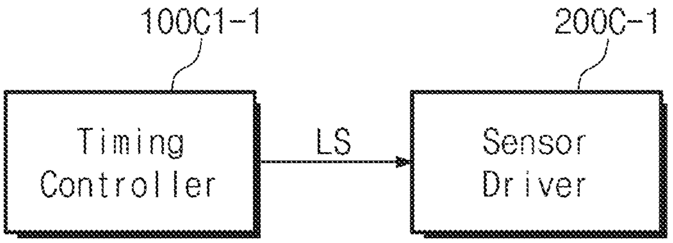
FIG. 13 is a block diagram of a timing controller and a sensor driver according to an embodiment of the present disclosure.
Figure 14:
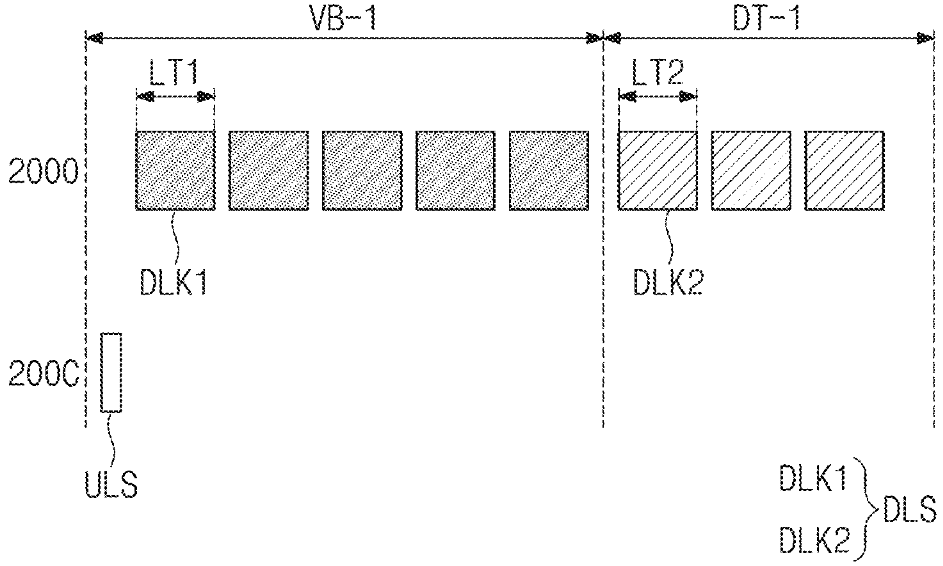
FIG. 14 is a view illustrating an operation of an input device and a sensor driver according to an embodiment of the present disclosure.

According to the present disclosure, the number of rising edges of the first downlink signal DLK1 may be smaller than the number of rising edges of the second downlink signal DLK2. The second downlink signal DLK2 may have a level higher than a level of the first downlink signal DLK1. The sensor driver 200C may receive the first downlink signal DLK1 having a relatively low level during the blank period VB in which noise occurs relatively less frequently and may receive the second downlink signal DLK2 having a relatively high level during the data period DT in which noise occurs relatively more frequently. A signal-to-noise ratio (SNR) of the sensor layer 200 to the input device 2000 in the blank period VB may be similar to or substantially the same as a signal-to-noise ratio (SNR) of the sensor layer 200 to the input device 2000 during the data period DT. That is, the signal-to-noise ratio (SNR) of the sensor layer 200 to the input device 2000 may be constant throughout the entire period. Accordingly, the sensing reliability of the interface device INF (refer to FIG. 1) may be improved FIG. 13 is a block diagram of a timing controller 100C1-1 and a sensor driver 200C-1 according to an embodiment of the present disclosure. FIG. 14 is a view illustrating an operation of an input device and a sensor driver according to an embodiment of the present disclosure. In FIGS. 13 and 14, the same reference numerals denote the same elements in FIG. 11, and thus, detailed descriptions of the same elements will be omitted.

Referring to FIGS. 3, 12A, 12B, 13, and 14, the timing controller 100C1-1 may receive information about a length of each of a blank period VB-1 and a data period DT-1 from a main controller 1000C. FIG. 14 shows a state in which the blank period VB-1 is longer than the data period DT-1, however, the present disclosure should not be limited thereto or thereby. As an example, the blank period may be shorter than the data period.

The timing controller 100C1-1 may generate a length signal LS based on the length of the blank period VB-1 and the length of the data period DT-1. The timing controller 100C1-1 may transmit the length signal LS to the sensor driver 200C-1.

The sensor driver 200C-1 may receive the length signal LS to obtain information about the length of the blank period VB-1 and the length of the data period DT-1.

The sensor driver 200C-1 may receive a plurality of first downlink signals DLK1 during the blank period VB-1. The sensor driver 200C-1 may successively receive the first downlink signals DLK1 during the blank period VB-1. As an example, the sensor driver 200C-1 may receive only the first downlink signals DLK1 from the input device 2000 during the blank period VB-1.

FIG. 14 shows a state in which the sensor driver 200C-1 receives five first downlink signals DLK1, however, the number of the first downlink signals DLK1 should not be limited thereto or thereby.

The sensor driver 200C-1 may receive a plurality of second downlink signals DLK2 during the data period DT-1. The sensor driver 200C-1 may successively receive the second downlink signals DLK2 during the data period DT-1. As an example, the sensor driver 200C-1 may receive only the second downlink signals DLK2 from the input device 2000 during the data period DT-1.

FIG. 14 shows a state in which the sensor driver 200C receives three second downlink signals DLK2*s*, however, the number of the second downlink signals DLK2 should not be limited thereto or thereby.

According to the present disclosure, the number of rising edges of the first downlink signal DLK1 may be smaller than the number of rising edges of the second downlink signal DLK2. The second downlink signal DLK2 may have a level higher than a level of the first downlink signal DLK1. The sensor driver 200C may receive the first downlink signal DLK1 having a relatively low level during the blank period VB-1 in which noise occurs relatively less frequently and the second downlink signal DLK2 having a relatively high level during the data period DT-1 in which noise occurs relatively more frequently. A signal-to-noise ratio (SNR) of the sensor layer 200 to the input device 2000 in the blank period VB-1 may be similar to or substantially the same as a signal-to-noise ratio (SNR) of the sensor layer 200 to the input device 2000 during the data period DT-1. That is, the signal-to-noise ratio (SNR) of the sensor layer 200 to the input device 2000 may be constant throughout the entire period. Accordingly, the sensing reliability of the interface device INF (refer to FIG. 1) may be improved.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. An interface device comprising:

an electronic device; and an input device communicating with the electronic device, wherein the electronic device comprising:

a display layer operating in a unit of display frame comprising a blank period and a data period;

a sensor layer disposed on the display layer and operating in a first mode to sense a first input generated by the input device; and a sensor driver driving the sensor layer and transmitting an uplink signal to the input device, wherein the input device transmits a plurality of first downlink signals comprising first information and a plurality of second downlink signals comprising second information different from the first information, and wherein the sensor driver successively receives the plurality of first downlink signals during the blank period and successively receives the plurality of second downlink signals during the data period and the sensor driver uses the second downlink signals during the data period to determine the second information of the input device.

2. The interface device of claim 1, wherein the input device comprises:

a receiver receiving the uplink signal;

a transmitter transmitting the plurality of first downlink signals and the plurality of second downlink signals to the sensor driver; and a power supply supplying a power to the input device.

3. The interface device of claim 2, wherein the first information comprises information about the input device and the second information comprises a signal to determine coordinate information of the input device.

4. The interface device of claim 1, wherein the sensor layer further operates in a second mode different from the first mode and sensing a second input generated by a user's body.

5. The interface device of claim 4, wherein the sensor layer operates in the second mode during the blank period.

6. The interface device of claim 4, wherein the second mode comprises a first touch mode and a second touch mode, wherein the sensor layer senses the user's body based on a self-capacitance in the first touch mode and senses the user's body based on a mutual capacitance in the second touch mode.

7. The interface device of claim 1, wherein each of the plurality of second downlink signals operates in a burst mode.

8. The interface device of claim 1, wherein each of the plurality of second downlink signals has a same driving period.

9. The interface device of claim 1, wherein each of the plurality of first downlink signals has at least two different waveforms.

10. The interface device of claim 1, wherein the plurality of first downlink signals comprise at least one first waveform and at least one second waveform, and wherein the second waveform is obtained by shifting the first waveform by a predetermined phase.

11. The interface device of claim 1, wherein a number of rising edges of the plurality of first downlink signals is smaller than a number of rising edges of the plurality of second downlink signals.

12. The interface device of claim 1, wherein the electronic device further comprises a timing controller to drive the display layer, the timing controller generates a length signal based on a length of the blank period and a length of the data period, and the timing controller transmits the length signal to the sensor driver.

13. The interface device of claim 12, wherein the sensor driver receives the length signal and receives the plurality of first downlink signals and the plurality of second downlink signals based on the length signal.

14. The interface device of claim 1, wherein the input device generates the plurality of first downlink signals and the plurality of second downlink signals in response to the uplink signal.

15. The interface device of claim 1, further comprising:

a data driving circuit providing a data signal to the display layer; and a demultiplexer circuit electrically connected between the data driving circuit and the display layer, wherein the display layer comprises a first-first data line, a first-second data line, and a plurality of pixels, the data signal comprises a first data signal having a first voltage level and a second data signal having a second voltage level different from the first voltage level, the data period comprises a first period and a second period, the demultiplexer circuit comprises a first switch connected between the first-first data line and the data driving circuit and a second switch connected between the first-second data line and the data driving circuit, the first switch is activated during the first period, the data driving circuit provides the first data signal to the first-first data line, the second switch is activated during the second period, and the data driving circuit provides the second data signal to the first-second data line.

16. An electronic device comprising:

a display layer operating in a unit of display frame comprising a blank period and a data period;

a sensor layer disposed on the display layer and operating in a first mode to sense a first input generated by an input device placed externally; and a sensor driver driving the sensor layer and transmitting an uplink signal to the input device, wherein the sensor driver receives only a first downlink signal comprising first information from the input device during the blank period, and the sensor driver receives only a second downlink signal comprising second information different from the first downlink signal from the input device during the data period and the sensor driver uses the second downlink signals during the data period to determine the second information of the input device.

17. The electronic device of claim 16, wherein the sensor layer further operates in a second mode different from the first mode, and wherein the second mode is a mode in which a second input generated by a touch event is sensed.

18. The electronic device of claim 17, wherein the sensor layer operates in the second mode during the blank period.

19. The electronic device of claim 17, wherein the second mode comprises a first touch mode and a second touch mode, the sensor layer senses the touch event based on a self-capacitance in the first touch mode, and the sensor layer senses the touch event based on a mutual capacitance in the second touch mode.

20. The electronic device of claim 16, wherein the second downlink signal operates in a burst mode.

21. The electronic device of claim 16, wherein the second downlink signal is provided in plurality, and each of the plurality of second downlink signals has a same driving period.

22. The electronic device of claim 16, wherein the first downlink signal has at least two different waveforms.

23. The electronic device of claim 16, wherein the first downlink signal comprises at least one first waveform and at least one second waveform, and wherein the second waveform is obtained by shifting the first waveform by a predetermined phase.

24. The electronic device of claim 16, wherein a number of rising edges of the first downlink signal is smaller than a number of rising edges of the second downlink signal.

25. The electronic device of claim 16, further comprising a timing controller to drive the display layer, wherein the timing controller generates a length signal based on a length of the blank period and a length of the data period, and the timing controller transmits the length signal to the sensor driver.

26. The electronic device of claim 25, wherein the sensor driver receives the length signal and receives the first downlink signal and the second downlink signal based on the length signal.

* * * * *